(12) United States Patent
Schiller et al.

(10) Patent No.: US 11,756,453 B2
(45) Date of Patent: Sep. 12, 2023

(54) TAG ATTACHMENT BY SHRINK FILM

(71) Applicant: Bedford Industries, Inc., Worthington, MN (US)

(72) Inventors: David Schiller, Sioux Falls, SD (US); Eric Milbrath, Brewster, MN (US)

(73) Assignee: Bedford Industries, Inc., Worthington, MN (US)

( * ) Notice: Subject to any disclaimer, the term of this patent is extended or adjusted under 35 U.S.C. 154(b) by 0 days.

(21) Appl. No.: 17/669,539

(22) Filed: Feb. 11, 2022

(65) Prior Publication Data
US 2022/0165183 A1 May 26, 2022

Related U.S. Application Data

(62) Division of application No. 16/689,245, filed on Nov. 20, 2019, now Pat. No. 11,295,636.
(Continued)

(51) Int. Cl.
| | |
|---|---|
| *G09F 3/02* | (2006.01) |
| *G09F 3/04* | (2006.01) |
| *B65C 3/06* | (2006.01) |

(52) U.S. Cl.
CPC .............. *G09F 3/02* (2013.01); *G09F 3/04* (2013.01); *B65C 3/065* (2013.01);
(Continued)

(58) Field of Classification Search
CPC .... B65C 3/065; B65D 23/14; B65D 55/0854; G09F 3/00; G09F 3/02; G09F 3/04;
(Continued)

(56) References Cited

U.S. PATENT DOCUMENTS

| | | | | |
|---|---|---|---|---|
| 5,842,323 | A | * | 12/1998 | Weder .................. B31F 1/0077 53/399 |
| 2002/0029520 | A1 | * | 3/2002 | Weder ...................... G09F 3/04 47/72 |

(Continued)

FOREIGN PATENT DOCUMENTS

| | | | |
|---|---|---|---|
| EP | 2664557 A1 | * 11/2013 | ......... B65D 55/0854 |
| JP | 2520765 Y2 | * 12/1996 | |

(Continued)

OTHER PUBLICATIONS

Machine translation of JP 2002-104331 via EPO (Year: 2002).*
(Continued)

*Primary Examiner* — Ian A Rummel
*Assistant Examiner* — Rebecca L Grusby
(74) *Attorney, Agent, or Firm* — Mai D. Lauer; Westman, Champlin & Koehler P.A.

(57) ABSTRACT

In one aspect, an article includes a first sleeve formed from a first heat-shrinkable polymer sheet, the first heat-shrinkable polymer sheet having opposed first and second edges, wherein the first sleeve is formed with a first seam proximate the first edge. A portion of the first heat-shrinkable polymer sheet extends between the first sleeve and the second edge. A tag is bonded to the portion of the first heat-shrinkable polymer sheet proximate the second edge at a first overlap zone of the tag and the portion of the first heat-shrinkable polymer sheet. In another aspect, an article includes a heat-shrinkable polymer sheet and a tag bonded to the sheet. The heat-shrinkable polymer sheet has a central area and a plurality of slits disposed through the sheet, at least one of the plurality of slits oriented to partially surround the central area.

9 Claims, 13 Drawing Sheets

Related U.S. Application Data

(60) Provisional application No. 62/776,607, filed on Dec. 7, 2018.

(52) U.S. Cl.
CPC ............... *G09F 2003/0226* (2013.01); *G09F 2003/0251* (2013.01); *G09F 2003/0269* (2013.01); *G09F 2003/0273* (2013.01)

(58) Field of Classification Search
CPC ..... G09F 2003/0251; G09F 2003/0273; G09F 2003/0269; B29C 51/04; B65B 53/02; B29K 2995/0049
See application file for complete search history.

(56) References Cited

U.S. PATENT DOCUMENTS

| | | | | |
|---|---|---|---|---|
| 2002/0194819 | A1* | 12/2002 | Weder | B65D 81/2084 53/432 |
| 2003/0089036 | A1* | 5/2003 | Weder | B65B 61/025 47/72 |
| 2014/0326727 | A1* | 11/2014 | Jouin | B65D 1/0238 206/459.5 |
| 2017/0129673 | A1* | 5/2017 | Wintz | B65D 73/0085 |
| 2020/0002042 | A1* | 1/2020 | Christman | B65B 21/245 |

FOREIGN PATENT DOCUMENTS

| | | | | | |
|---|---|---|---|---|---|
| JP | 2001199489 | A | * | 7/2001 | |
| JP | 2002091309 | A | * | 3/2002 | |
| JP | 2002104331 | A | * | 4/2002 | ............ B65D 71/08 |
| JP | 2002240853 | A | * | 8/2002 | |
| JP | 2002249112 | A | * | 9/2002 | |
| JP | 2008209571 | A | * | 9/2008 | |
| JP | 2013130694 | A | * | 7/2013 | |

OTHER PUBLICATIONS

Machine translation of JP 2002-240853 via EPO (Year: 2002).*
Machine translation of JP 2520765 Y2 via EPO (Year: 1996).*
Machine translation of JP 2002-091309 via EPO (Year: 2002).*
Machine translation of JP 2001-199489 via EPO (Year: 2001).*
Machine translation of JP 2002-249112 via EPO (Year: 2002).*
Machine translation of JP 2008-209571 via EPO (Year: 2008).*
Drobny, Jiri George. "Processing Methods Applicable to Thermoplastic Elastomers", Handbook of Thermoplastic Elastomers (Second Edition), doi:10.1016/B978-0-323-22136-8.00004-1 (Year: 2014).*
Machine translation of JP 2013-130694 via EPO (Year: 2013).*

* cited by examiner

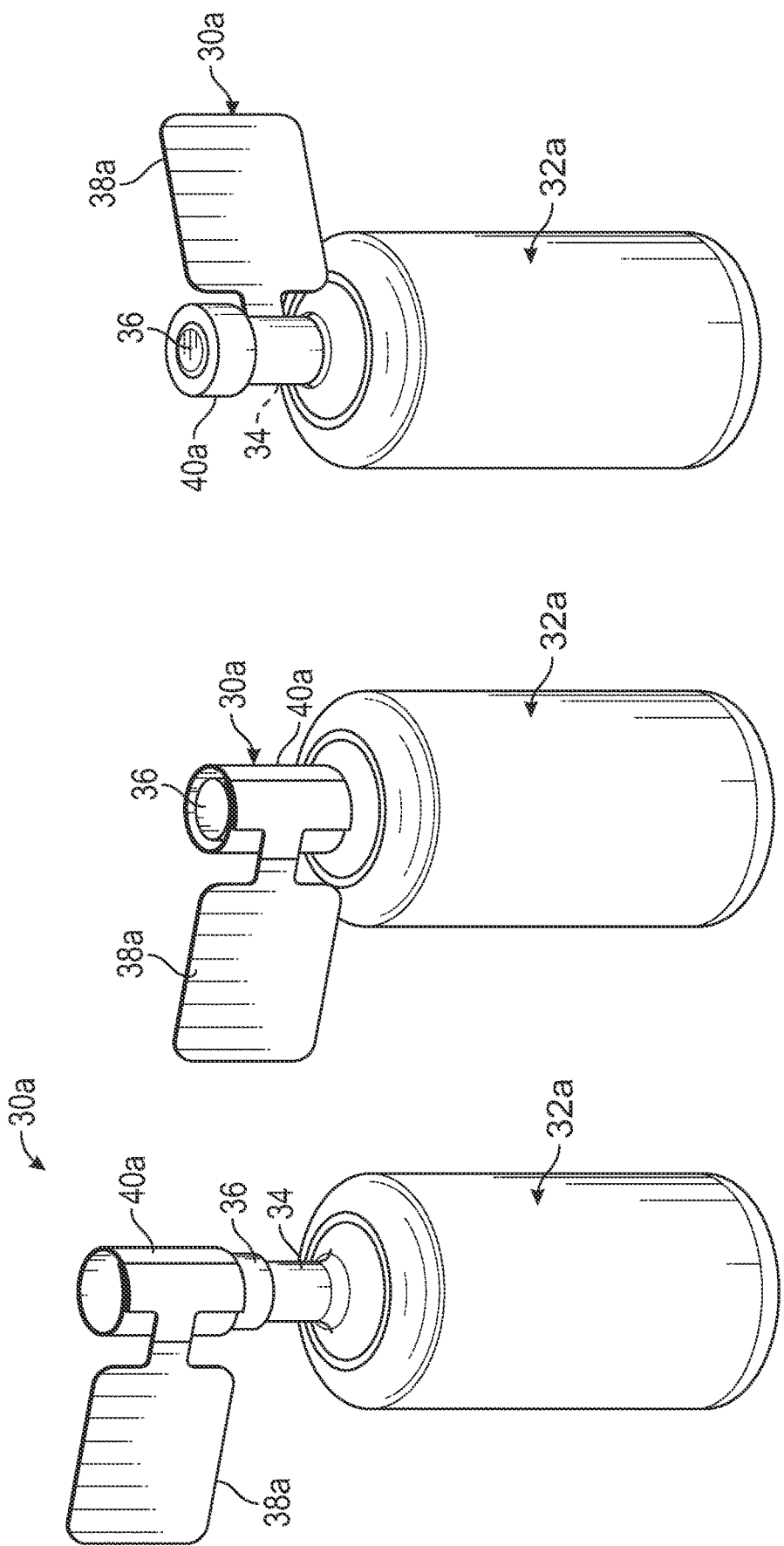

TAG ATTACHMENT BY SHRINK FILM

CROSS-REFERENCE TO RELATED APPLICATION

This application is a division of U.S. patent application Ser. No. 16/689,245 filed Nov. 20, 2019, which claims the benefit of priority from U.S. Provisional Patent Application No. 62/776,607, filed Dec. 7, 2018. The contents of these priority applications are hereby incorporated by reference in their entirety.

BACKGROUND

The prior art is replete with merchandise labeling using bands about merchandise. Sometimes the heretofore known bands have elastic sections united to non-elastic sections, and sometimes they are endless elastic bands commonly called rubber bands.

For example, U.S. Pat. No. 2,516,292 (Bennett) of Jul. 25, 1950 teaches a preformed labeling article of elastic and non-elastic sections for holding bananas constantly under tension as they shrink. The ends of the elastic and non-elastic sections of the band are overlapped and adhesively or otherwise bonded together. U.S. Pat. No. 5,733,652 (Stowman et al.) of Mar. 31, 1998 discusses banding of merchandise by a technique involving in situ bonding of the ends of a strip of elastic material with or without an interposed separate strip of material that is not necessarily elastic. In situ bonding, however, involves carrying bonding equipment to the site where banding of merchandise is to be done (e.g., for bonds formed by heat sealing) or involves removing and disposing of a release liner at the site of banding (e.g., for bonds formed by using liner-protected contact or pressure-sensitive adhesive layers). Neither approach is ideal for field application of labels. Also, when either a preformed band of bonded sections or an in situ formed band of bonded sections is stretched about merchandise, it exerts a compressive force on the merchandise. Relatively strong bonds are needed to prevent bond separation under such circumstances since the bonds are in the line of stretching and are subjected to the tension of stretching during use. A still further problem is the questionable reliability of machine-readable codes on stretched bands encircling merchandise, such as UPC bar codes, for example.

Where endless bands of rubber (commonly called rubber bands) are used, as in teachings of U.S. Pat. No. 5,617,656 (Ludlow et al.); U.S. Pat. No. 5,697,177 (Ludlow et al.); and U.S. Pat. No. 6,058,639 (Tinklenberg), a second step arises for attaching a tag. The two-step approach is not the most efficient, although it has been one of the more popular approaches in the past because the tag is distinct from the rubber band and can carry reliable UPC bar coding that is easy to handle at checkout scanning.

A known merchandise marking article capable of single-step application to achieve simultaneous banding and scan-reliable bar-coding of merchandise is described in U.S. Pat. No. 5,778,583 (Larsen) of Jul. 14, 1998, where the tag is attached to the rubber band by encircling a section of the tag about the rubber band prior to the time the rubber band is fastened in banding condition about merchandise. However, economy is not a hallmark for the manufacture of this prior art article.

An issue encountered when using elastic bands for labeling is that the bands can easily be removed by a user. Such removal may undesirably allow consumers to remove or switch labels or tags between products. Accordingly, in some cases, a more permanent method for attaching a tag to a product is desirable.

SUMMARY

In one aspect, an article includes a first sleeve formed from a first heat-shrinkable polymer sheet, the first heat-shrinkable polymer sheet having opposed first and second edges, wherein the first sleeve is formed with a first seam proximate the first edge. A portion of the first heat-shrinkable polymer sheet extends between the first sleeve and the second edge. A tag is bonded to the portion of the first heat-shrinkable polymer sheet proximate the second edge at a first overlap zone of the tag and the portion of the first heat-shrinkable polymer sheet.

In another aspect, an article includes a heat-shrinkable polymer sheet and a tag bonded to the sheet. The heat-shrinkable polymer sheet has a central area and a plurality of slits disposed through the sheet, at least one of the plurality of slits oriented to partially surround the central area.

This disclosure, in its various combinations, may also be characterized by the following listing of items:

1. An article including:
   a first sleeve formed from a first heat-shrinkable polymer sheet, the first heat-shrinkable polymer sheet having opposed first and second edges, wherein the first sleeve is formed with a first seam proximate the first edge;
   a portion of the first heat-shrinkable polymer sheet that extends between the first sleeve and the second edge; and
   a tag bonded to the portion of the first heat-shrinkable polymer sheet proximate the second edge at a first overlap zone of the tag and the portion of the first heat-shrinkable polymer sheet.
2. The article of item 1 wherein the first seam is substantially linear, and wherein a height dimension of the tag parallel to the first seam is equal to or less than a length of the first seam between first and second open ends of the first sleeve.
3. The article of item 2 including a neck disposed on the portion of the first heat-shrinkable polymer sheet, the neck having a dimension measured parallel to the height dimension of the tag that is less than the height dimension of the tag.
4. The article of item 3 wherein a joint between the tag and the portion of the first heat-shrinkable polymer sheet is located on the neck.
5. The article of any one of items 1-4 wherein the first sleeve includes a hole disposed through the first heat-shrinkable polymer sheet.
6. The article of item 5 wherein the hole is positioned on an opposite side of the first sleeve from the first seam.
7. The article of any one of items 1-6 wherein the first overlap zone does not include an entirety of the tag.
8. The article of any one of items 1-7 including a second sleeve formed from a second heat-shrinkable polymer sheet, the second heat-shrinkable polymer sheet having opposite third and fourth edges, wherein the second sleeve is formed with a second seam proximate the third edge, and wherein the tag is bonded to the second heat-shrinkable polymer sheet proximate the fourth edge.
9. The article of item 8 wherein the tag is bonded to the second heat-shrinkable polymer sheet at a second overlap zone.
10. The article of item 9 wherein a height of the tag at the first overlap zone differs from a height of the tag at the second overlap zone.

11. An article including:
  a heat-shrinkable polymer sheet having a central area and a plurality of slits disposed through the sheet, at least one of the plurality of slits oriented to partially surround the central area; and
  a tag bonded to the sheet.
12. The article of item 11 wherein the central area is circular and the at least one of the plurality of slits is concentric with the central area.
13. The article of item 11 or 12 wherein the central area and plurality of slits form a product attachment portion of the article, and wherein the article further includes a neck disposed between the product attachment portion and the tag.
14. The article of item 13 wherein the neck is formed as part of the tag.
15. The article of any one of items 11-14, wherein the tag is bonded to the sheet at an overlap zone.
16. The article of item 15 wherein the overlap zone does not include an entirety of the tag.
17. The article of any one of items 11-16 wherein the central area includes an aperture through the sheet.
18. The article of item 17 wherein the aperture is circular, and the at least one of the plurality of slits is concentric with the aperture.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 1 is a perspective view of an exemplary tag article positioned for use on a product.

FIG. 2 is an exemplary view of the tag article with a sleeve thereof positioned about a cap and neck of the product.

FIG. 3 is a perspective view of the tag article attached to the product by shrinking the sleeve around the cap and neck.

Figure 4A:
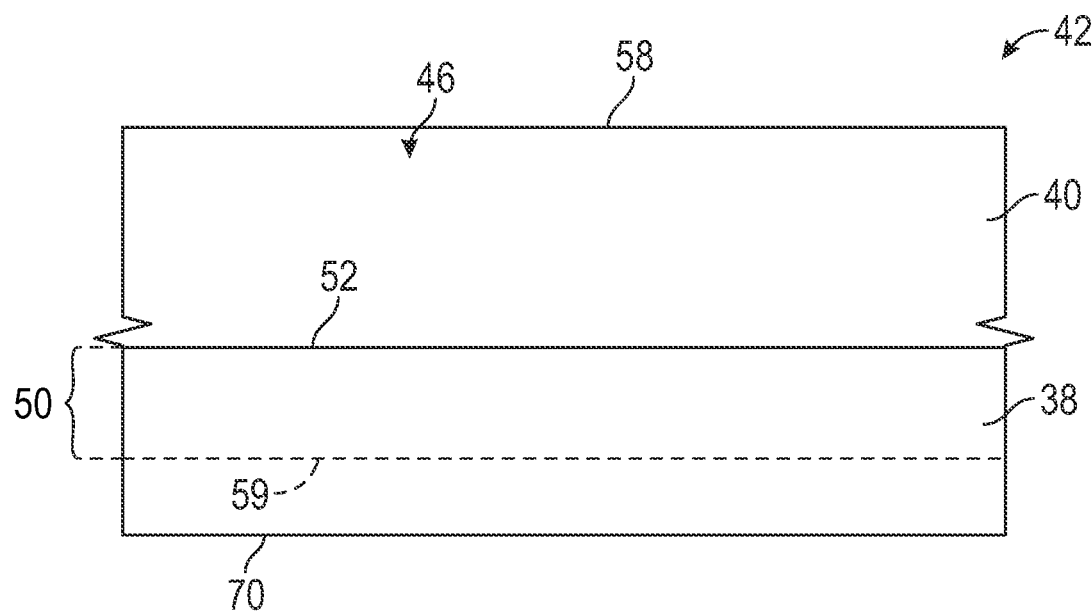
FIG. 4A is a plan view of a portion of a laminated web assembly from which a plurality of tag assemblies may be formed.

While the above-identified figures set forth several embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

FIGS. 1-3 show consecutive steps in a method for attachment of a tag article 30a to a product 32a. In the illustrated embodiment, product 32a is configured as a bottle having a neck 34 and lid, cover or cap 36. However, it is contemplated that tag article 30 can be configured for use with products of other configurations, such as, for example, cans, tubes, boxes, bags and bundles of products, for example. Moreover, while the illustrations depict the attachment of a tag article 30 to a top portion of a product 32, it is also contemplated that the tag article could be additionally or alternatively positioned about other portions of a product or about an entirety of a smaller product. In this description, some elements will be referenced with numbers that may or may not include lower case letters. When a particular embodiment of an element is described, the description will use the number and letter designation. When the element in general is described, the description will use only the number without the letter designation. All descriptions of elements also apply to like or analogous elements (designated with the same number) except in the case of conflicting descriptions.

In an exemplary embodiment, tag article 30 is configured with a tag 38 attached to shrink film 40. In an exemplary embodiment, shrink film 40a is configured as a sleeve sized to pass over cap 36 and neck 34 of product 32a, as shown in FIGS. 1 and 2. While a sleeve with substantially circular cross-section is illustrated, it is contemplated that the sleeve can have other shapes, such as an open-ended tubular sleeve having a square or rectangular cross-section, for example. Once in position, heat can be applied to shrink film 40a to shrink the sleeve about neck 34 and cap 36, thereby permanently attaching tag article 30a and thereby its associated tag 38a, to product 32a, as shown in FIG. 3. In an exemplary embodiment, a suitable material for shrink film 40a is oriented so that maximum shrinkage occurs in the diameter direction of the sleeve, and minimal shrinkage occurs in the height direction of the sleeve. In an exemplary embodiment, a sleeve with an initial diameter (as in FIGS. 1 and 2) of about 2 inches can shrink down to a diameter of about 0.5 inch at neck 34 if needed (as in FIG. 3).

Figure 4B:
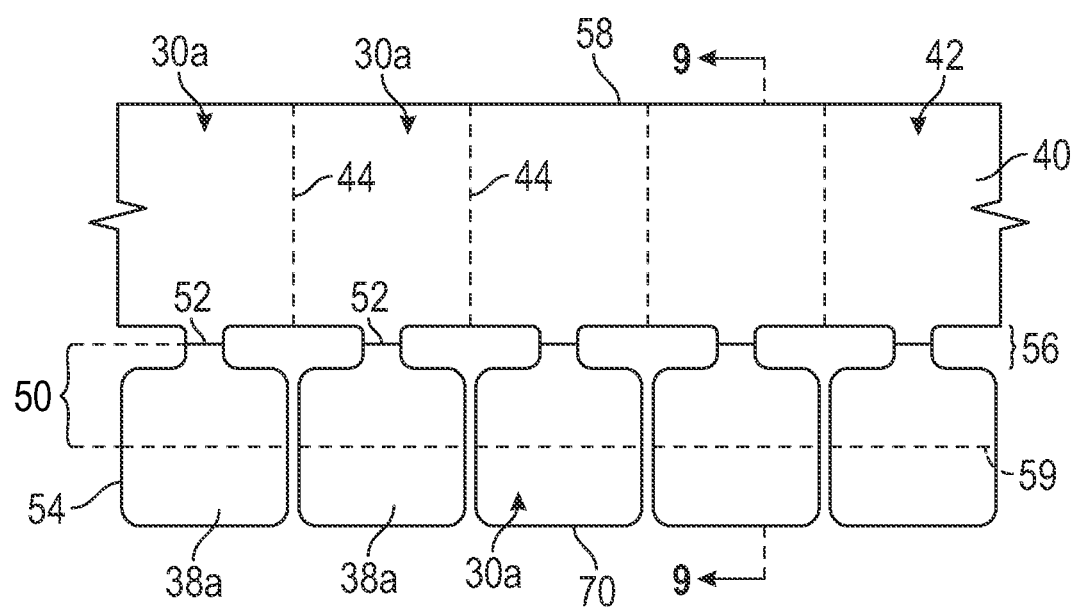
FIG. 4B is a plan view of the web assembly after cutting to define a plurality of connected tag assemblies.
Figure 9:
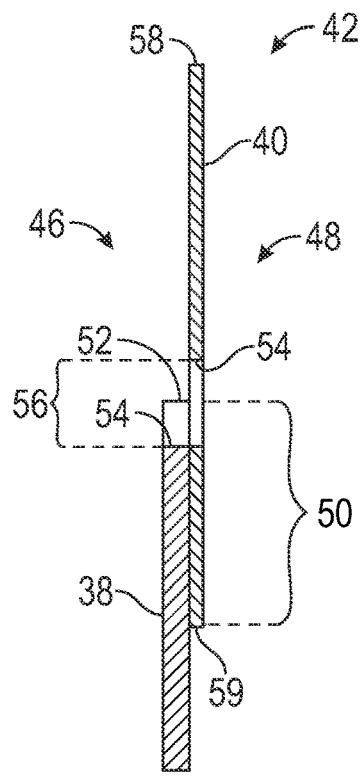
FIG. 9 is a cross-sectional view, taken along line 9-9 of FIG. 4B.

FIG. 4A is a plan view of a portion of a laminated web 42 from which a plurality of tag assemblies 30a may be formed. FIG. 4B is a plan view of the web 42 after cutting to define a plurality of connected tag assemblies 30a. FIG. 9 is a cross-sectional view of the web 42, taken along line 9-9 of FIG. 4B.

As shown in FIG. 4A, in an exemplary method of manufacturing tag assemblies 30a, an in-line web processing system is used to form a laminated web 42 including a strip of shrink film 40 and a strip of tag material 38. As shown in FIG. 4B, adjacent tag assemblies 30a are delineated, in an exemplary embodiment, by a line of demarcation 44. In the illustrated embodiment, web 42 includes a strip of shrink film 40 having a plurality of tags 38a attached thereto. Web 42 has front surface 46 and an opposed back surface 48 (labeled in FIG. 9). In an exemplary embodiment, tag material strip 38 overlaps shrink film strip 40 at overlap zone 50, so that a joint 52 between tag material strip 38 and shrink film strip 40 is visible on the front surface 46 of web 42. Overlap zone 50 is sufficient in area to ensure that tag material strip 38 does not separate from shrink film strip 40 when the material of shrink film strip 40 is subjected to heat in order to cause shrinkage.

As shown in FIG. 4B, web 42 has been processed, such as by cutting, to define a plurality of connected tag articles 30. Such cutting can be performed by a laser cutting apparatus, for example. Web 42 can be made of sufficient length to include a desired number of articles 30 in series. Alternatively, a web can also be provided with more than one strip of tag material 38. A second strip of tag material 38 could be provided in to overlap and bond to shrink film 40 proximate edge 58, for example. The web could be cut to provide an array of articles 30, rather than the single illustrated row. Other web layouts are also contemplated to provide numerous rows of tag articles on a web. Moreover, while the illustrated embodiment includes an edge 59 of shrink film 40 that does not extend to edge 70 of tag strip 38, it is contemplated that shrink film 40 may be provided in the form of a continuous sheet that underlies a plurality of parallel strips 38 of tag material.

In the illustrated embodiment, a continuous cut is provided along cut line 54, and at least partial cuts are provided at lines of demarcation 44. In the illustrated embodiment, cut line 54 is configured to completely sever and separate adjacent tags 38a from each other and provide narrowed necks 56 proximate joint 52 between each tag 38 and its respective shrink film 40. In some embodiments, a seam at joint 52 is positioned on a narrowed portion of tag article 30, such as at neck 56. Thus, shrinkage of shrink film strip 40 does not cause undesirable wrinkling or other deformation on a major portion of tag 38.

Figure 5:
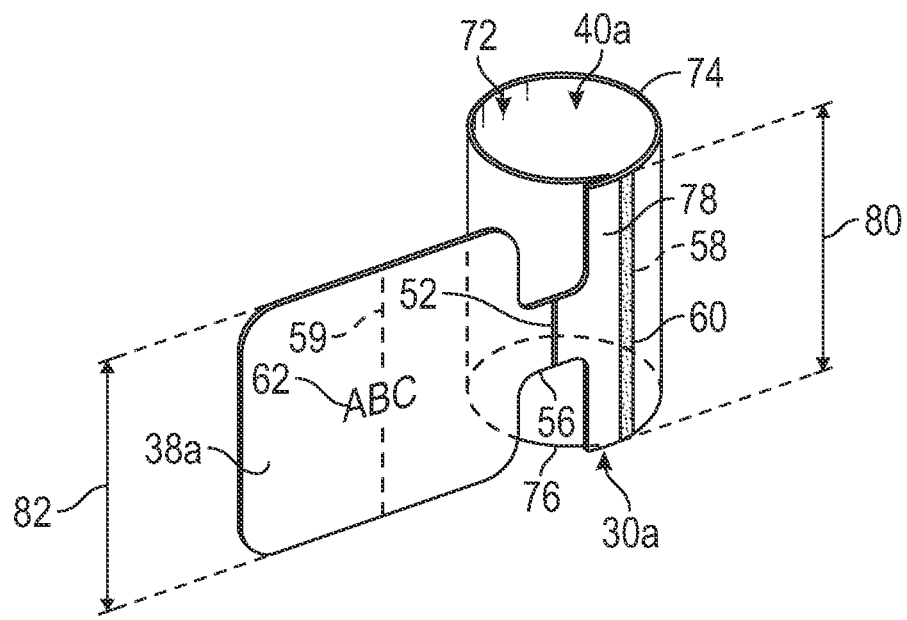
FIG. 5 is a perspective view of one of the tag assemblies of the web of FIG. 4, rolled into a sleeve configuration.

In another embodiment, a full cut is provided at each demarcation line 44 to fully separate the tag articles 30a of web 42 from each other. In one method of use, as illustrated in FIGS. 4B and 5, shrink film 40 of web 42 is rolled (horizontally if oriented as in FIG. 4B; vertically if oriented as in FIG. 5) to position edge 58 proximate necks 56. A seam 60 is provided to form a continuous sleeve 72 of shrink film 40 across many tag articles 30a. The seamed web 42 is flattened and wound up into a roll or spool configuration for use on an application machine. The application machine would cut the web 42 along demarcation line 44 just before placing an individual tag article 30a on a product 32a.

Excess web material (i.e., "weed") resulting from the cutting of cut line 54 is preferably removed. In some embodiments, adjacent tags 38 can remain ruptureably connected to each other. Line of demarcation 44 can delineate ruptureably connected adjacent tag articles 30 with perforations, score lines, cut lines of full or partial depth, and other mechanisms for forming a ruptureable line or contour of weakness connecting adjacent tag articles 30. Moreover, while a particular shape and configuration of the demarcation 44 is illustrated, it is contemplated that other forms and shapes can be used. For example, demarcation 44 need not be straight and can include curves and other shapes. Web 42 can be further processed while retaining at least some of the tag articles in connection, such as by rolling, folding, or cutting into sheets and stacking the cut sheets, for example. Adjacent tag articles 30 can remain ruptureably connected at demarcation 44. Alternatively or additionally, individual tag articles 30 may be fully severed for further use.

As shown in FIG. 9, the strip of tag material 38 and the strip of shrink film 40 are joined along a flat overlap zone 50. Web 42 is sheet-like in the sense that shrink film 40 is formed of a sheet of heat-shrinkable polymer, and the material for tag 38 is formed from a strip of sheet material that is flat in character, although they may be drapeable and floppy and thus not always displayed in flat form. Tag strip 38 and shrink film sheet 40 are joined so that the sheet character of each is aligned with the sheet character of the other, giving a total unitary sheet-like character to web 42.

Overlap zone 50 is formed where tag strip 38 overlies and overlaps shrink film 40. As shown in FIGS. 4B and 9, tag strip 38 and shrink film 40 may be bonded along the entire overlap zone 50. However, in other embodiments, tag strip 38 and shrink film 40 may be bonded together only at portions of the overlap zone 50. Moreover, to assist in bonding tag strip 38 and shrink film 40 together, an adhesive may be provided between tag strip 38 and shrink film 40 along portions or all of overlap zone 50.

A material for tag strip 38 is preferably flexible and pliable but inextensible (e.g., not stretchable and not elastic) for most applications. For purposes of this disclosure, an elastic material is one that has an initial dimension in a relaxed state; the dimension increases under tension, such as by stretching; moreover, upon release of the tension force, the dimension returns to, or nearly to, the initial unstretched dimension. In an exemplary embodiment, the material for tag strip 38 is substantially non-elastic and non-stretchy under hand-applied forces. For example, the sheet material for tag strip 38 can have sufficient dimensional stability to carry a reliably scannable (i.e., non-distorted) print of a Universal Product Code (UPC) symbol as well as other human-readable or machine-readable markings. Moreover, in an exemplary embodiment, a material for tag strip 38 does not shrink, melt, or otherwise change form due to application of heat sufficient to shrink the shrink film 40.

In an exemplary embodiment, the sheet material for tag strip 38 is sufficiently water resistant to not disintegrate and not significantly pucker, wrinkle, or otherwise disfigure or deform when placed in water. Moreover, in an exemplary embodiment, inks or other printing media used for indicia 62 are sufficiently water resistant to avoid disintegration or destruction when repeatedly subjected to water and washing operations (as is common for produce displays in supermarkets). The sheet material for tag strip 38 also should be somewhat tough in the sense of being sufficiently tear resistant to deter damage to it during handling.

Suitable materials for forming the tag strip 38 include paper, polystyrenic thermoplastics, polyolefinic thermoplastics, polyesters, and others. Exemplary suitable thermoplastic materials include polymers of styrene, ethylene, propylene, as well as a variety of other monomers and mixtures of monomers (e.g., to make co-polymers and ter-polymers, etc.). Sheet thickness for polyester plastics and some others can be quite thin, even down to the 3 mil (0.08 mm) or 4 mil (0.10 mm) range, and still exhibit the toughness and the practical non-elasticity desired.

The polymers may be formulated so that printing inks are readily accepted on the surface of the sheet material. Polymers can also be treated with special surface treatments to enhance acceptance of printing inks for indicia 62, which can be provided on a front and/or back surface of tag 38. The exact structure and composition of suitable sheet materials for tag strip 38 can vary widely. Any of a variety of commercially available inks compatible with or accepted on tag strip 38 and retained thereon, and in any desired color, may be used to print indicia 62. In a case where it is desirable to use a water-soluble ink, a thin film of water-insoluble plastic may be applied over the ink to enhance water resistance of the printed markings.

To increase impact resistance of tag strip 38, a styrene-butadiene-styrene impact modifier can be useful in amounts up to about 40 percent of the weight of a polystyrene material. Tag strips 38 of such material are highly stable against stretching. They have desired flexibility balanced by a slight stiffness that contributes to ease of handling during manufacture and use. Such tag strips 38 also can be reliably printed, especially when first subjected to a surface treatment such as, for example, a corona treatment such as available from Pillar Technologies of Hartland, Wis., a division of Illinois Tool Works. The treatment enhances wettability and adhesion characteristics of inks and adhesives on plastic substrates.

Shrink film 40 may be made from any of a variety of heat-shrinkable materials. For example, suitable polymer materials include printable heat-shrinkable poly-vinyl chloride (PVC), polyester (PETG) or styrene butadiene-styrene (SBS/OPS) commercially available from Bonset America Corporation of Greensboro, N.C. Another suitable material is polylactic acid (PLA) biodegradable shrink film, available from Plastic Suppliers Inc. of Columbus, Ohio.

Selection of materials for tag article 30 may take into account factors such as cost and bonding compatibility with shrink film 40. Generally, similar materials tend to bond together (as by polymer bonding) better than dissimilar materials; and materials of like polarity usually bond better than materials of unlike polarity. Thus, tag material selection can be made from polymers in the same family as the shrink film, such as those including at least some monomers related to, or the same as, those present in shrink film. Surface treatments such as corona treatments also help to improve bonding. Still further, compatibilizers that adjust the polarity of material can be used to improve bonding. Additional information is described in U.S. Pat. No. 8,635,795 to Ludlow et al., which is hereby incorporated by reference.

Heat welding as by applying heat and pressure on overlap zone 50 be useful to form the bond between tag 38 and shrink film 40. Sonic welding is another way to unify the layers and achieve a cohesive bond between tag 38 and shrink film 40. Extruding a molten polymer of shrink film 40 to tag strip 38 is another way of forming web 42. This method can be particularly effective where molecules or parts of molecules of the shrink 40 film and tag strip 38 at the overlap zone 50 interdiffuse with each other. Bonds can also be formed by interposing an intermediate layer at the overlap zone 50 (e.g., an adhesive) to which both the tag material and the shrink film material will readily bond because of their compatibility to the intermediate material. Still further, treatment of the surface areas where bonding is to be accomplished can be effective. Even mechanical bonding can be effective, as where the tag material is porous (e.g., paper and the porous polymer product called "Teslin"), and the shrink film material is applied in molten condition or at least in a softened condition and pressed into the voids or interstices of the porous tag 38. Any useful bonding technique and structure that joins the tag 38 with the shrink film 40 in a manner forming a unifying flat bond at overlap zone 50 that can withstand delamination in expected use is suitable.

FIG. 5 is a perspective view of an individual tag article 30a, removed from the web 42, such as by rupture along demarcation 44, and rolled into a sleeve configuration. As shown in FIGS. 4A and 4B, shrink film 40 includes an edge 58 distant from tag material strip 38. As shown in FIG. 5, that edge 58 is rolled, and a bonded seam 60 is formed at or near a location where edge 58 meets another portion of shrink film 40. Because shrink film 40 is formed of a visually transparent or translucent material in exemplary embodiments, seam 60 is visible from an outside of tag article 30a. However, it is to be understood that in the illustrated embodiment, edge 58 contacts shrink film 40 on an underside thereof (inner surface of sleeve 72). Seam 60 is formed by bonding portions of shrink film 40 to itself, such as by ultrasonic welding. Suitable equipment for forming such a sleeve configuration in shrink film 40 includes the AccraSeam™ FC Stanford Shrink Sleeve Converting Equipment, commercially available from Accraply, Inc. of Plymouth, Minn.

Figure 6:
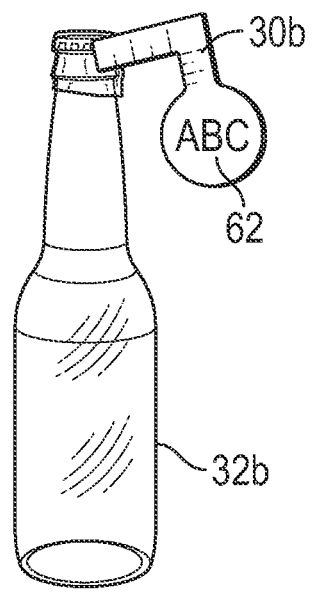
FIG. 6 is a perspective view of a second exemplary embodiment of a tag article attached to a product.
Figure 7:
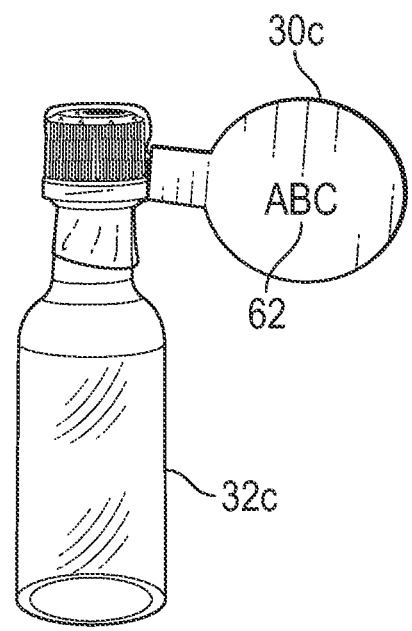
FIG. 7 is a perspective view of a third exemplary embodiment of a tag article attached to a product.

Many different configurations of tag article 30 are possible to impart desired display characteristics. For example, FIG. 6 shows a second exemplary embodiment of a tag article 30*b* in use with a product 32*b*. FIG. 7 shows a third exemplary embodiment of a tag article 30*c* in use with a product 32*c*.

Figure 8:
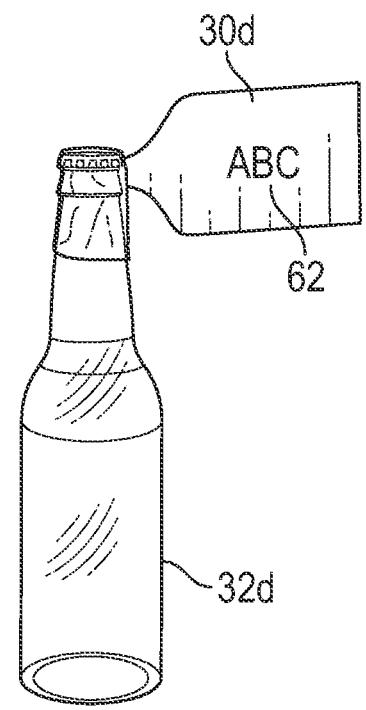
FIG. 8 is a perspective view of a fourth exemplary embodiment of a tag article attached to a product.
Figure 8A:
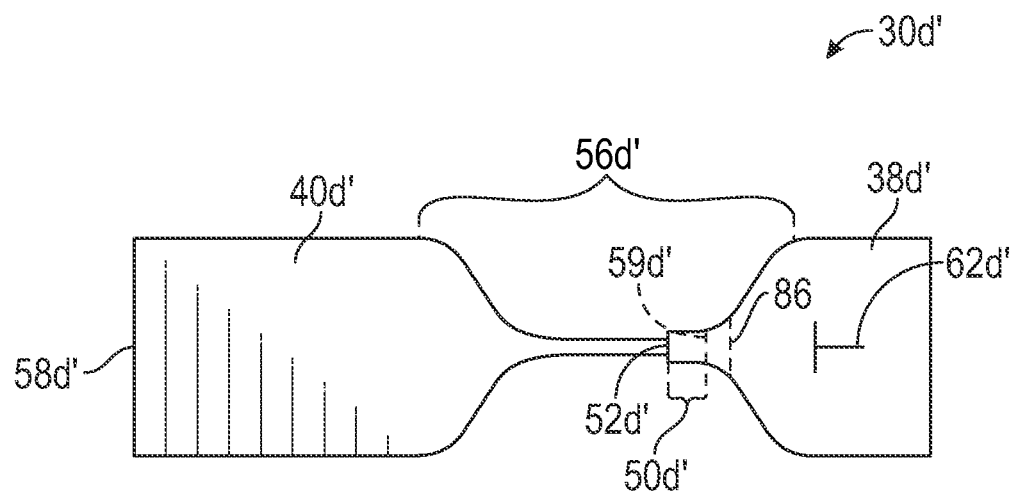
FIG. 8A is a plan view of a variation of the tag article of FIG. 8.
Figure 8B:
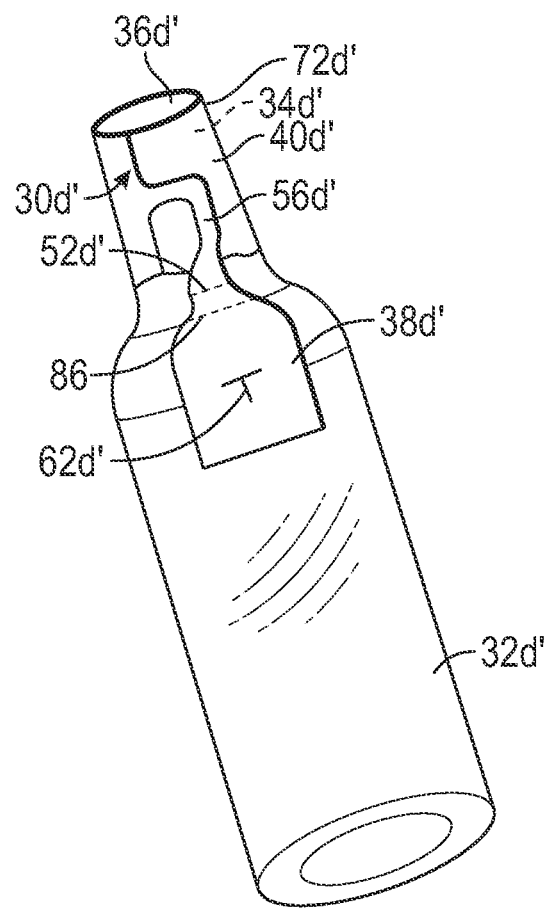
FIG. 8B is a perspective view of the tag article of FIG. 8A attached to a product.

FIG. 8 shows a fourth exemplary embodiment of a tag article 30*d* in use with a product 32*d*. FIGS. 8A and 8B show a variation of the tag article 30*d* of FIG. 8. In tag article 30*d'* of FIGS. 8A and 8B, neck 56*d'* has a longer dimension so that tag 38*d'* is suspended from and hangs downward from sleeve 72*d'* when tag article 30*d'* is attached to product 32*d'*. Moreover, overlap zone 50*d'* between tag 38*d'* and shrink film 40*d'* is relatively small. On a portion of tag 38*d'* outside overlap zone 50*d'*, a tear-off line 86 is provided by which a user can tear a major portion of tag 38*d'* off from tag article 30*d'*. In this manner, the major portion of tag 38*d'* can serve as a severable coupon for the product 32*d'*, for example. Placing the tear-off line 86 outside of the overlap zone 50*d'* allows the tearing to be accomplished more easily, as only the material of tag 38*d'* must be torn, and the integrity of shrink film 40*d'* is not affected. While perforations are illustrated as forming tear-off line 86, it is contemplated that any form of line of weakness can be used, including those described with reference to demarcation 44.

Thus, it is contemplated that tag assemblies 30 of the present disclosure can be configured in many different shapes and designs, including changes to the shapes and sizes of tags 38, shrink films 40, and a form of connection therebetween, such as the presence or absence of a neck 56, and variations in forms thereof.

Moreover, indicia 62 may be provided on tag 38 and/or shrink film 40. Indicia 62 may include informational or decorative matter to be printed, embossed, or otherwise provided on tag article 30. Additionally or alternatively, tag article 30 may carry other substances, such as fragrances or light emitting or reflective particles, for example.

Figures 10, 11:
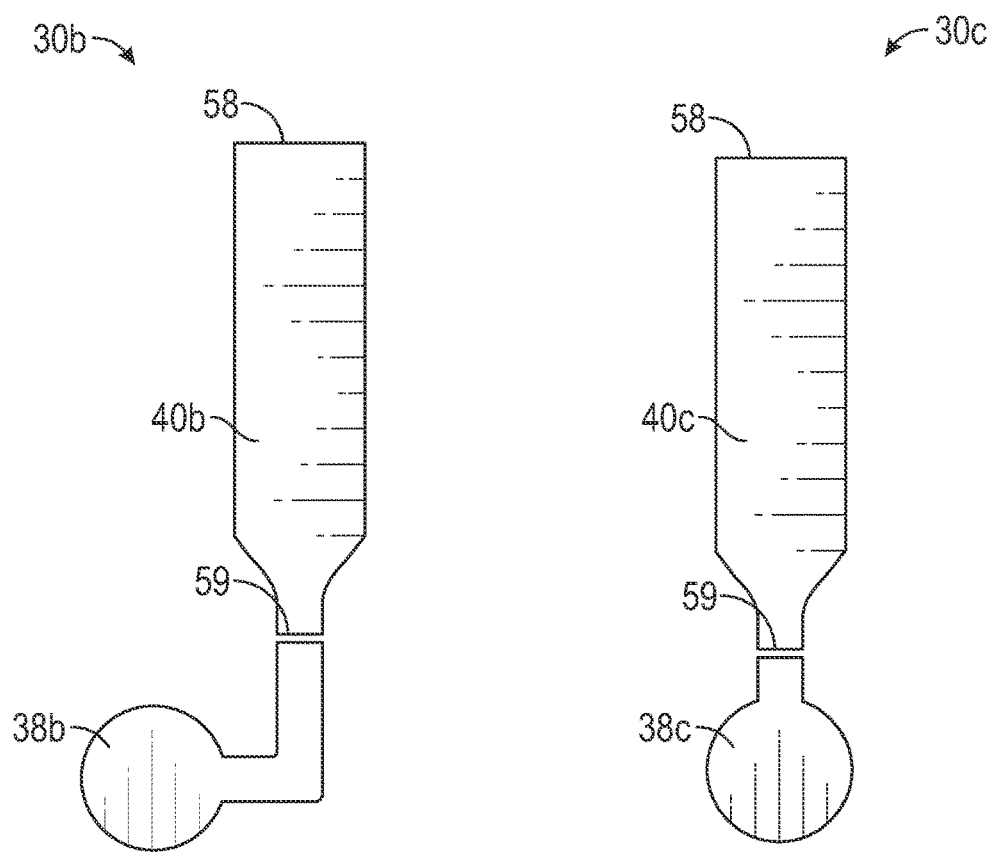
FIG. 10 is an exploded view of components of the tag article of FIG. 6.
FIG. 11 is an exploded view of the components of the tag article of FIG. 7.

FIGS. 10 and 11 are exploded views of components for the embodiments of tag article 30*b* shown in FIG. 6 and tag article 30*c* shown in FIG. 7, respectively. To form the tag assemblies 30*b*, 30*c*, those components of shrink film 40 and tag 38 would be overlapped and bonded together, as shown in FIG. 9, for example.

Figure 12:
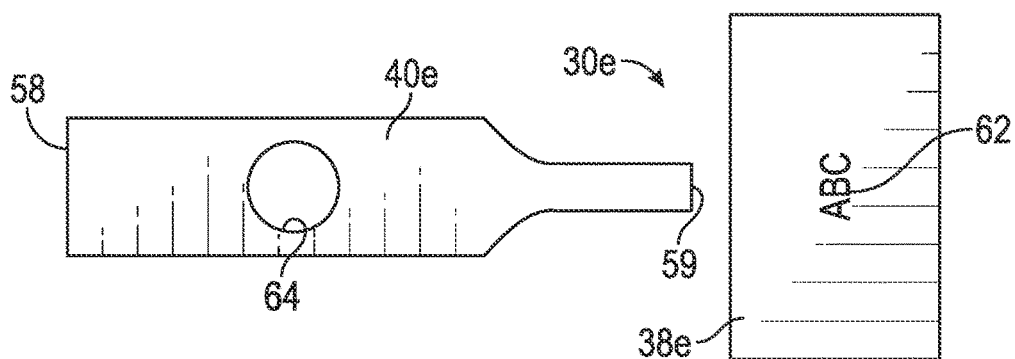
FIG. 12 is an exploded view of components of a tag article in a fifth exemplary embodiment.
Figure 13:
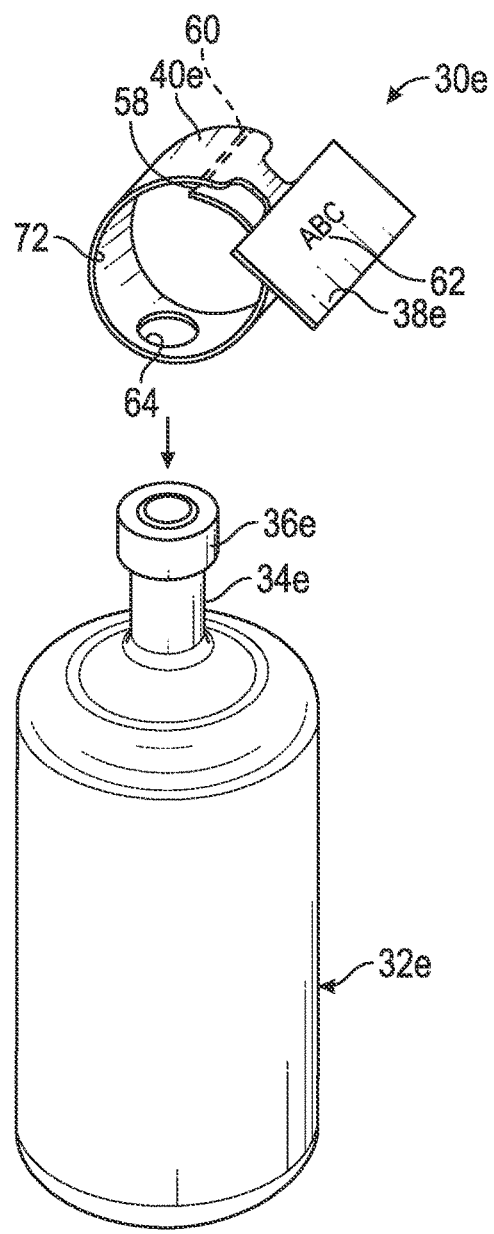
FIG. 13 is a perspective view of a bonded tag article having the components of FIG. 12, positioned for use with a product.
Figure 14A:
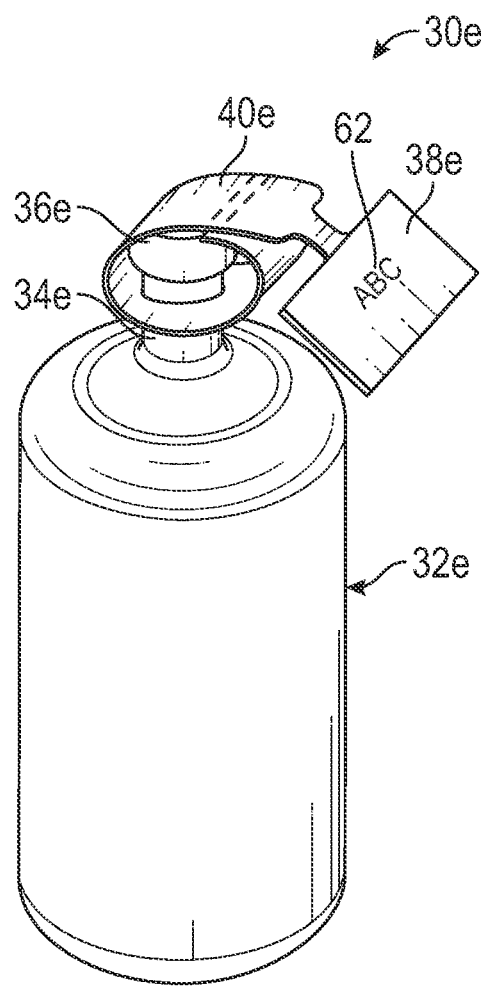
FIG. 14A is a perspective view of a product with the fifth embodiment of a tag article placed thereon.
Figure 14B:
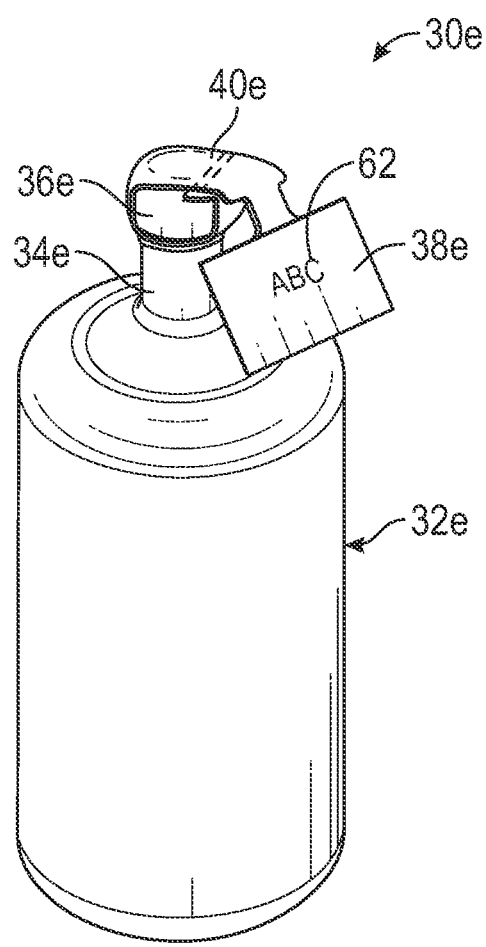
FIG. 14B is a perspective view of a product with the fifth embodiment of a tag article attached thereto by shrinking a shrink-film sleeve around a portion of the product.

FIG. 12 is an exploded view of components for a fifth exemplary configuration of tag article 30*e*. To form tag article 30*e*, the components of shrink film 40*e* and tag 38*e*, would be overlapped and bonded together, as explained with reference to FIG. 9, for example. As shown in FIGS. 12 and 13, shrink film 40*e* includes an aperture 64 therethrough, sized to allow passage therethrough of cap 36*e* of product 32*e*. As shown in FIGS. 13 and 14A, after insertion of cap 36*e* through aperture 64, a portion of shrink film 40*e* rests at neck 34*e* of product 32*e*, and the sleeve of shrink film 40*e* encircles top and side portions of cap 36*e*. As shown in FIG. 14B, after the application of heat sufficient to shrink the shrink film 40*e*, tag article 30*e* is attached to product 32*e* in a manner that allows for display of tag 38*e* and indicia 62 thereon.

Figure 15:
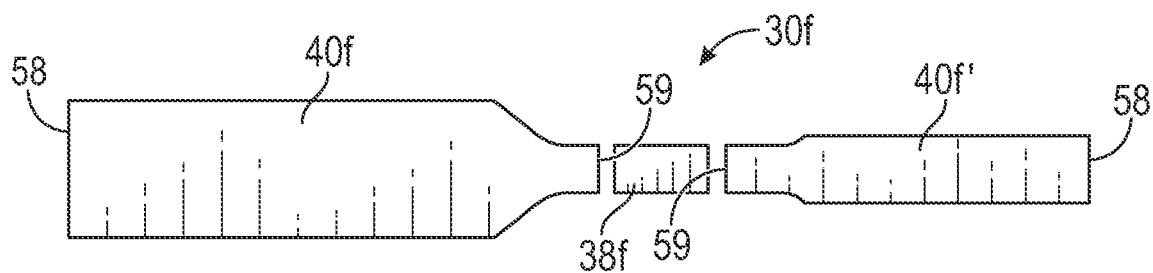
FIG. 15 is an exploded view of components of a sixth exemplary embodiment of a tag article.

FIG. 15 is an exploded view of components of a sixth exemplary embodiment of a tag article 30*f* including two shrink films 40*f* and 40*f'* and a tag 38*f* configured to be bonded between and to each of the shrink films 40*f*, 40*f'*.

Figure 16A:
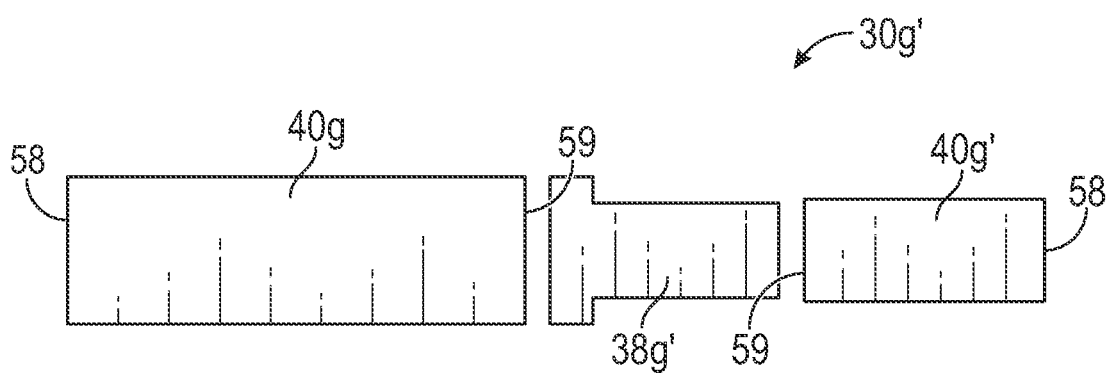
FIG. 16A is an exploded view of components of a seventh exemplary embodiment of a tag article.

FIG. 16A is an exploded view of components of a seventh exemplary embodiment of a tag article 30*g'*, including two shrink films 40*g* and 40*g'*, configured for bonding to opposite ends of an intermediate tag 38*g'*, having a stepped configuration with end widths corresponding to those of the respective shrink films 40*g*, 40*g'*.

Figure 16B:
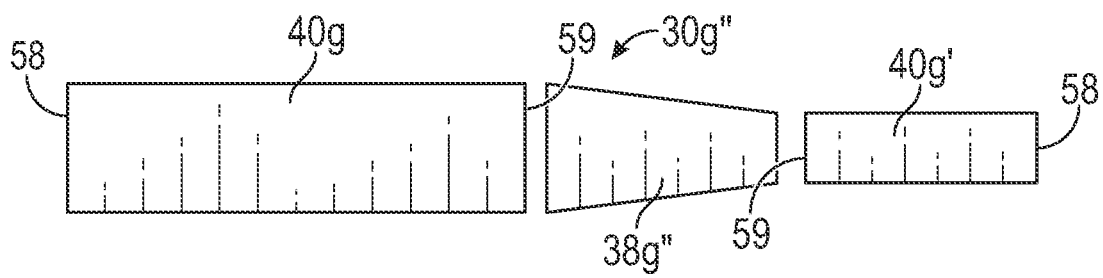
FIG. 16B is an exploded view of components of an eighth exemplary embodiment of a tag article.

FIG. 16B is an exploded view of components of an eighth exemplary embodiment of a tag article 30*g"*, including two shrink films 40*g* and 40*g'*, configured for bonding to opposite ends of an intermediate tag 38*g"*, having a tapered configuration with end widths corresponding to those of the respective shrink films 40*g*, 40*g'*.

Figure 17:
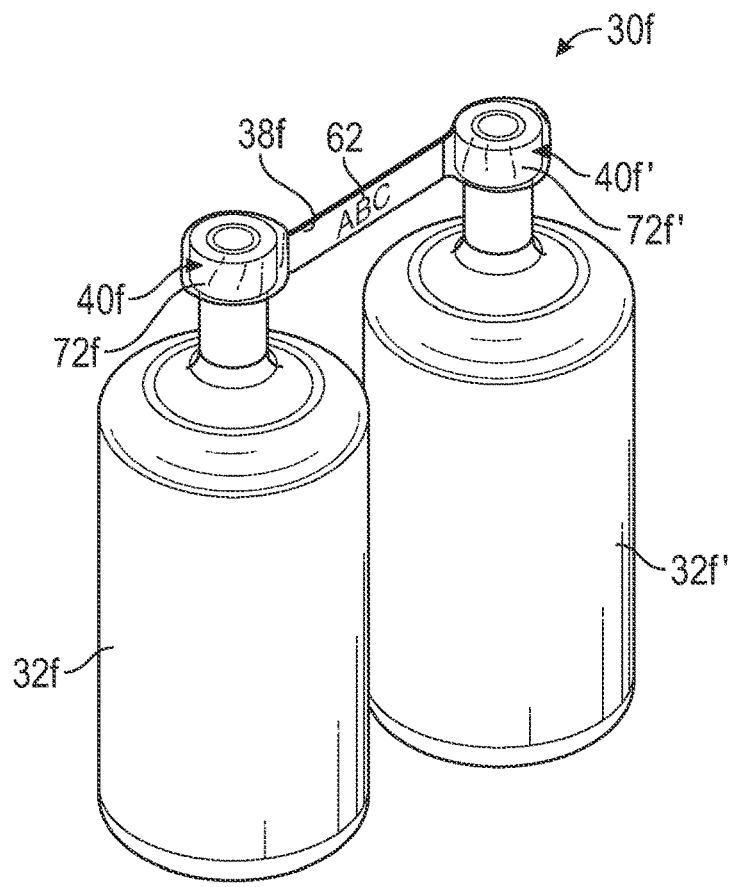
FIG. 17 is a perspective view showing a bonded tag article of the sixth exemplary embodiment in use with two products.

FIG. 17 is a perspective view of the tag article 30*f* in use, wherein each of the shrink films 40*f*, 40*f'* is formed into a sleeve, such as described with shrink film 40*a* of FIG. 5. The two sleeves of shrink films 40*f*, 40*f'* are attached to respective products 32*f*, 32*f'*, in a manner similar to that shown with respect to FIGS. 1-3 for tag article 30*a*. As shown in FIG. 17, tag article 30*f* allows for the permanent attachment of product 32*f* to product 32*f'* while allowing for display of indicia 62 on a tag 38*f* therebetween. Use of such a tag article 30*f* is especially advantageous in situations where product 32*f* is a primary product, and product 32*f'* is a supplemental, complementary, or sample product, for example. Because of the permanent nature of the shrink sleeve bond to product 32*f*, 32*f'* at each of shrink films 40*f*, 40*f'*, the tag article 30*f* prevents unintentional or improper detachment of product 32*f'* from product 32*f*. Moreover, the tag 38*f* can be formed longer than illustrated to serve as a handle between the two attached products 32*f*, 32*f'*.

Figure 18:
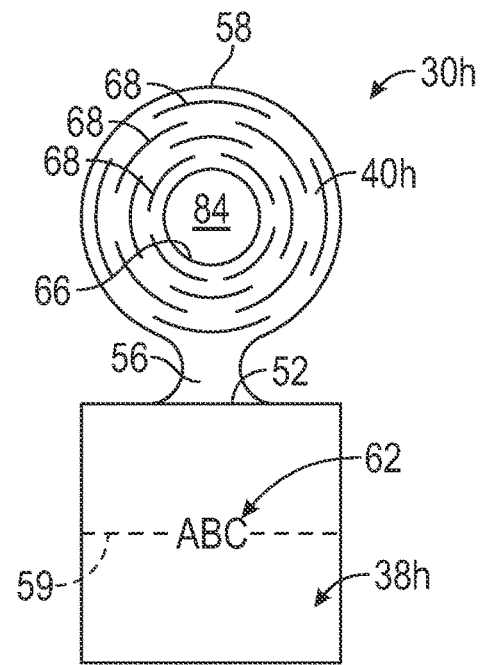
FIG. 18 is a plan view of a ninth exemplary tag article.

FIG. 18 is a plan view of an ninth exemplary embodiment of a tag article 30*h*. In this embodiment, tag 38*h* and shrink film 40*h* are joined as discussed above with respect to FIG. 9, for example. However, rather than forming shrink film 40*h* in a sleeve configuration, shrink film 40*h* is configured as a flat film piece having an aperture 66 through central area 84.

Figure 20:
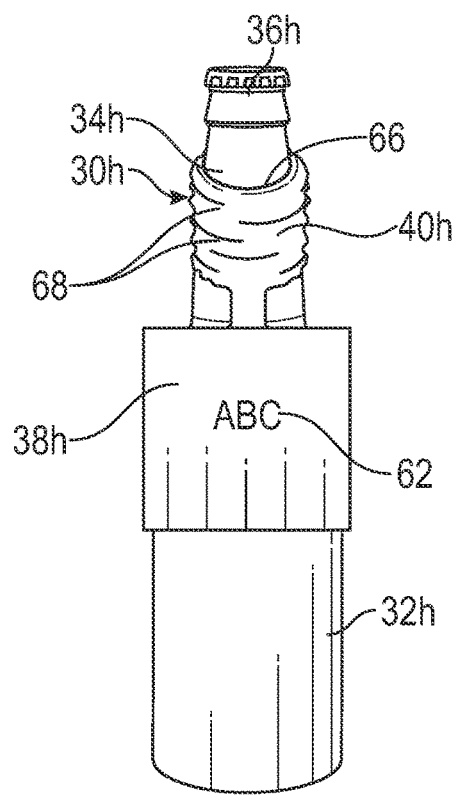
FIG. 20 is a perspective view of the tag article of FIGS. 18 and 19 attached to the product.

Shrink film strip 40 extends from edge 58 distant from tag 38 to edge 59 positioned adjacent tag 38. In the illustrated embodiment, aperture 66 is circular, and a portion of shrink film 40*h* surrounding aperture 66, concentrically, is also substantially circular. However, it is contemplated that other shapes and configurations for a substantially flat shrink film portion 40*h* are also suitable. In the illustrated embodiment, shrink film 40*h* includes a plurality of cuts, slots or slits 68 formed partially concentrically and surrounding aperture 66. These slits 68 facilitate the shrinkage of shrink film 40*h* out of the initial flat or plane configuration, to allow shrink film 40*h* to more readily conform to contours of a portion of product 32*h*, as shown in FIG. 20, for example.

An advantage of a tag article 30*h* as shown in FIG. 18 is that the flat, initially planar configuration does not require an additional tube or sleeve forming step. Another difference is that a biaxial shrinkable material is most suitable for shrink film 40*h*. In an exemplary embodiment, such a biaxial shrinkable material is able to shrink about 50% in each of two orthogonal directions. In contrast, in the sleeve variations of the other tag articles 30*a-g*, the shrink material usually shrinks monoaxially primarily in a horizontal direction with respect to the product 32, so that any graphics or other indicia provided on the shrinkable film 40*a-g* will not be overly distorted upon shrinkage.

Figure 19:
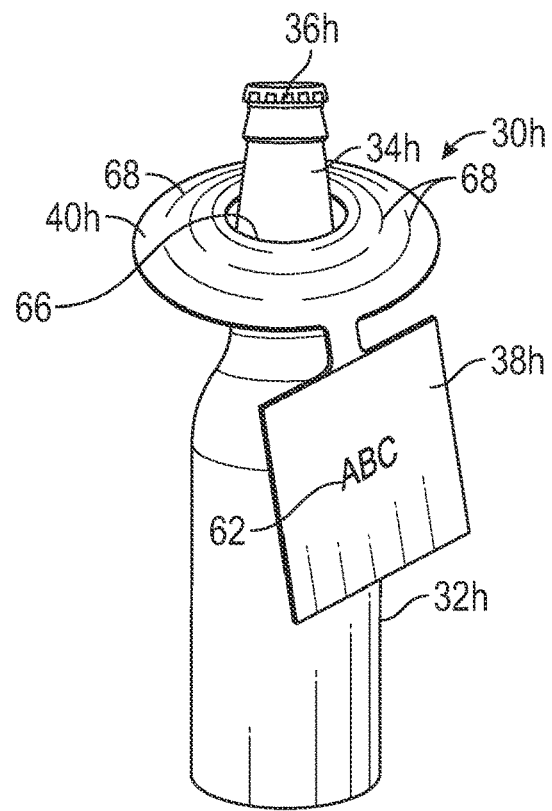
FIG. 19 is a perspective view of the tag article of FIG. 18 positioned for use with a product.

For use, as shown in FIG. 19, shrink film 40*h* of tag article 30*h* is placed over a product 32*h* so that a portion of the product, such as cap 36*h* and neck 34*h* are inserted through aperture 66, for example. Subsequently, heat is applied to shrink film 40*h*, so that shrink film 40*h* contracts, thereby forming closely to the contours of product 32*h*.

Figure 21:
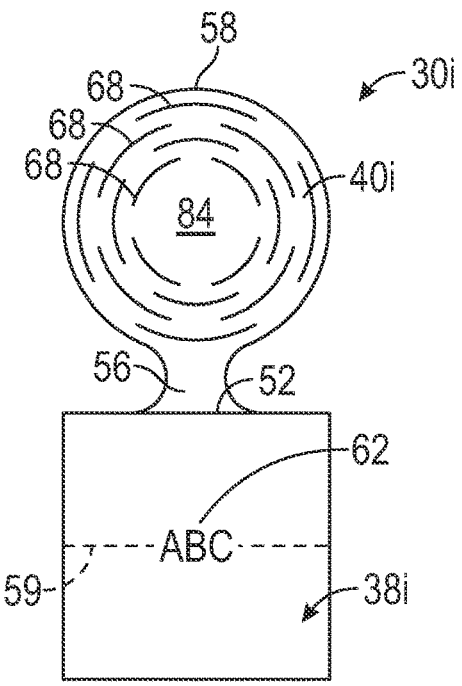
FIG. 21 is a plan view of the tenth exemplary embodiment of a tag article, shown in use in FIGS. 22 and 23.
Figure 22:
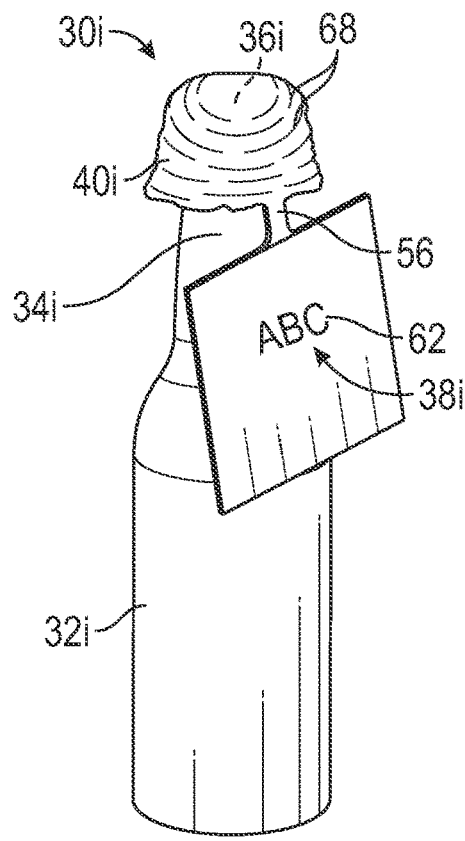
FIG. 22 is a perspective view of the tag article of FIG. 21 positioned for use with a product.
Figure 23:
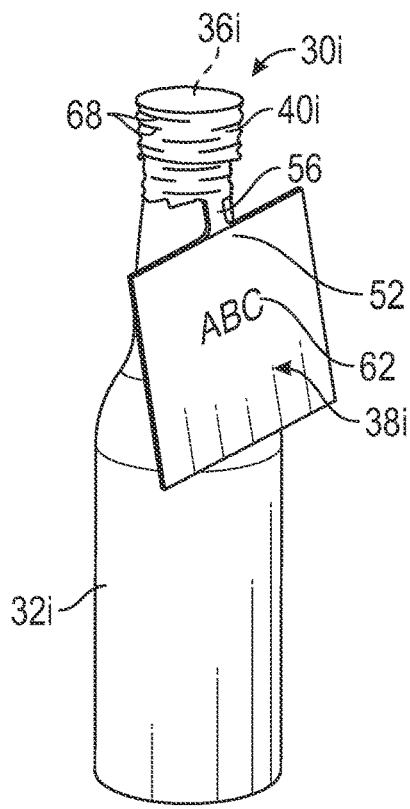
FIG. 23 is a perspective view of the tag article of FIG. 21 attached to the product.

FIGS. 21-23 show a tenth exemplary embodiment of a tag article 30*i*, which is similar to tag article 30*h*, except that shrink film 40*i* does not have an aperture therethrough. Accordingly, in use, as shown in FIGS. 21 and 22, the shrink film 40*i* remains on top of a portion of product 32*i*, such as cap 36*i*, and shrinks around the cap 36*i* to conform thereto.

Figure 24:
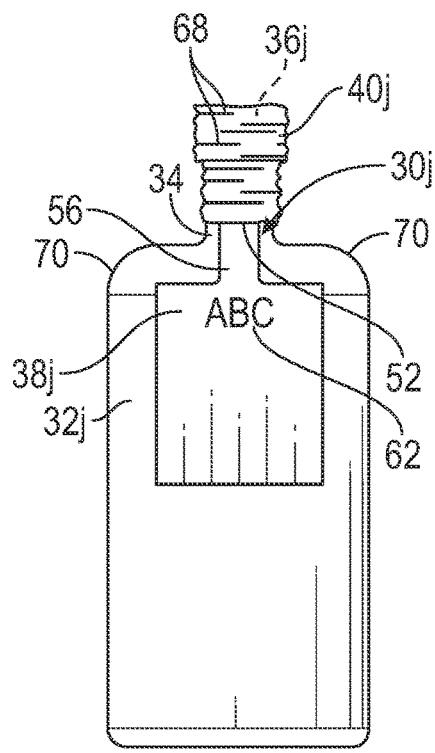
FIG. 24 is a perspective view of an eleventh exemplary embodiment of a tag article in use with a product.

FIG. 24 is an elevation view of an eleventh exemplary embodiment of a tag article 30*j*, which is similar to tag article 30*i* except that wherein tag 38*j* has an extended, elongated neck 56 and a seamless tag presentation up to the top of neck 56. Because the shape of product 32*j* has a pronounced shoulder 70 between the neck 34 and the body of the product, the elongated neck 56 allows tag 38*j* to hang downward along the body of product 32*j* rather than project out sideways along shoulder 70. Moreover, the material of tag 38*j* extends entirely onto neck 56 to offer a seamless tag presentation. In the illustrated embodiment, joint 52 between tag 38 and shrink film 40 (on the presentation side of tag 38 bearing indicia 62) is positioned at the top of the neck portion 56. The overlap of tag 38 and shrink film 40 on the opposite side of tag 38 extends along neck 56 and optionally downward onto a portion of the major display area of tag 38*j*. It is contemplated that many variations can be made in the components of tag assemblies 30, taking into consideration the desired display features of the tag article 30 relative to a product 32 on which the tag article 30 is to be used.

Non-limiting, exemplary embodiments of disclosed articles are described. In exemplary embodiments as shown in FIGS. 1-17, an article 30 includes a sleeve 72 (labeled in FIG. 5) formed from a heat-shrinkable polymer sheet 40. The sheet 40 has opposed first and second edges 58, 59. The sleeve 72 has opposed first and second open ends 74, 76, wherein the sleeve 72 is formed with a seam 60 proximate the first edge 58. A portion 78 of the sheet 40 extends from the sleeve 72 to the second edge 59. Tag 38 is bonded to the portion 78 of the sheet 40 proximate the second edge 59 at an overlap zone 50 of the tag 38 and the portion 78 of the sheet 40 between joint 52 and edge 59. In exemplary embodiments, the overlap zone 50 does not include an entirety of the tag 38.

In exemplary embodiments, seam 60 is substantially linear, and a height dimension 82 of the tag 38 parallel to the seam 60 is less than a length 80 of the seam 60 between the first and second open ends 74, 76. In exemplary embodiments, a neck 56 is disposed on the portion 78 of the sheet 40, the neck 56 having a dimension measured parallel to the height dimension 82 of the tag 38 that is less than the height dimension 82 of the tag 38. In exemplary embodiments, a joint 52 between the tag 38 and the portion 78 of the sheet 40 is located on the neck 56. In an exemplary embodiment illustrated in FIGS. 12-14B, the sleeve 72 includes a hole 62 disposed through the sheet 40. In an exemplary embodiment, the hole 62 is positioned on an opposite side of the sleeve 72 from the seam 60.

In exemplary embodiments, article 30*f*, 30*g'*, 30*g"* includes a first sleeve 72*f* and a second sleeve 72*f'*. First sleeve 72*f* is formed from a first heat-shrinkable polymer sheet 40*f*, 40*g* the first sheet 40*f*, 40*g* having opposite first and second edges 58, 59. The first sleeve 72*f* is formed with a seam 60 proximate the first edge 58. The second sleeve 72*f'* is formed from a second heat-shrinkable polymer sheet 40*f'*, 40*g'*. The second sheet 40*f'*, 40*g'* has opposite third and fourth edges 58, 59. The second sleeve 72*f'* is formed with a seam 60 proximate the third edge 58. Tag 38*f*, 38*g'*, 38*g"* is bonded to the first sheet 40*f*, 40*g* proximate the second edge 59 and is bonded to the second sheet 40*f'*, 40*g'* proximate the fourth edge 59. In exemplary embodiments of article 30*f*, 30*g'*, 30*g"*, the tag 38*f*, 38*g'*, 38*g"* is bonded to the first sheet 40*f*, 40*g* at a first overlap zone 50; and the tag 38*f*, 38*g'*, 38*g"* is bonded to the second sheet 40*f'*, 40*g'* at a second overlap zone 50. In the exemplary article 30*f*, 30*g'*, 30*g"*, a height of the tag 38*f*, 38*g'*, 38*g"* at the first overlap zone approximately matches a height of the first sheet 40*f*, 40*g* at the first overlap zone. In the exemplary article 30*f*, the height of the first sheet 40*f* at the first overlap zone (near edge 59) differs from a height of the first sheet 40*f* outside the first overlap zone (such as near edge 58). In the exemplary article 30*g'*, 30*g"*, the height of the tag 38*g'*, 38*g"* at the first overlap zone (with sheet 40*g*) differs from a height of the tag 38*g'*, 38*g"* at the second overlap zone (with sheet 40*g'*).

In exemplary embodiments, article 30*h*, 30*i*, 30*j* includes a heat-shrinkable polymer sheet 40*h*, 40*i*, 40*j* having a central area 84 and a plurality of slits 68 disposed through the sheet 40*h*, 40*i*, 40*j*. At least one of the plurality of slits 68 is oriented to partially surround or encircle the central area 68. Tag 38*h*, 38*i*, 38*j* is bonded to the sheet 40*h*, 40*i*, 40*j*. In exemplary embodiments, the central area 84 is circular and the at least one of the plurality of slits 68 is concentric with the central area 84. In exemplary embodiments, the central area 84 and plurality of slits 68 form a product attachment portion of the article 30*h*, 30*i*, 30*j*, and the article 30*h*, 30*i*, 30*j* further includes a neck 56 disposed between the product attachment portion and the tag 38*h*, 38*i*, 38*j*. In the embodiment of article 30*j*, the neck 56 is formed as part of the tag 38*j*. Tag 38*h*, 38*i*, 38*j* is bonded to the sheet 40*h*, 40*i*, 40*j* at an overlap zone 50. In some embodiments, the overlap zone 50 does not include an entirety of the tag 38*h*, 38*i*, 38*j*. In the embodiment of article 30*h*, the central area 84 includes an aperture 66 through the sheet 40*h*. In an exemplary embodiment, aperture 66 is circular, and the at least one of the plurality of slits 68 is concentric with the aperture 66. Although a circular shrink film, circular aperture and partially circular cuts are illustrated, it is contemplated that other shapes for these components are also suitable, including oval, elliptical, square, rectangular, triangular, and other curved and polygonal shapes.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:

1. An article comprising:
    a flat heat-shrinkable polymer sheet having a circular central area and a plurality of slits disposed through the sheet, at least one of the plurality of slits oriented to partially surround the central area and oriented to be concentric with the central area; and
    a tag bonded to the sheet;
    wherein the central area and plurality of slits form a product attachment portion of the article, and wherein the article further includes a neck formed as part of the sheet and disposed between the product attachment portion and the tag.

2. The article of claim 1 wherein the tag comprises indicia disposed thereon.

3. The article of claim 1 wherein the sheet comprises a biaxial shrinkable material.

4. The article of claim 3 wherein the biaxial shrinkable material is able to shrink about 50% in each of two orthogonal directions.

5. The article of claim 1 wherein the central area comprises a circular aperture through the sheet.

6. The article of claim 5 wherein the at least one of the plurality of slits is concentric with the aperture.

7. The article of claim 1, wherein the tag is bonded to the sheet at an overlap zone.

8. The article of claim 7 wherein the overlap zone does not include an entirety of the tag.

9. The article of claim 1, wherein the plurality of slits comprises at least a first slit and a second slit disposed through the sheet, wherein:
- both of the first and second slits are oriented to partially surround the central area;
- both of the first and second slits are oriented to be concentric with the central area;
- the first slit is positioned at a first distance from the center; and
- the second slit is positioned at a second distance from the center that is greater than the first distance.

\* \* \* \* \*